June 9, 1936.  E. G. TEMPLETON  2,043,937
COLLAPSIBLE CHUCK
Filed April 15, 1930

Inventor
Edwin G. Templeton.

Attorney

Patented June 9, 1936

2,043,937

UNITED STATES PATENT OFFICE 2,043,937

COLLAPSIBLE CHUCK

Edwin G. Templeton, Akron, Ohio, assignor to Wingfoot Corporation, Wilmington, Del., a corporation of Delaware Application April 15, 1930, Serial No. 444,544

11 Claims. (Cl. 154—9)

The invention relates to collapsible chucks and it has particular relation to a chuck that shall be especially applicable to facilitate the construction of small diameter straight side tires in which inextensible beads are employed.

One object of the invention is to provide a collapsible chuck the periphery of which, when collapsed, is substantially less than the collapsed periphery of chucks heretofore employed.

Another object of the invention is to provide a collapsible chuck which is simple in construction and which may be quickly and easily manipulated from tire supporting to collapsed condition.

It is customary in constructing tire casings to assemble a plurality of plies of material in superposed relation on a cylindrical drum or chuck mounted to rotate about a horizontal axis. The width of the drum preferably is somewhat less than the width of the plies of material so that the edge portions of the latter extend past the edges of the drum and may be turned inwardly against the sides thereof. Endless tire beads which are smaller in diameter than the drum are then assembled within the inwardly extending portions of the fabric plies.

When the beads are extensible, only slight difficulty is encountered in removing the tire from the core. However, when inextensible beads are employed, it is necessary that the drum be collapsed to permit the removal of the tire therefrom. Although various forms of collapsible drums or cores have been devised, some of these forms do not collapse sufficiently to permit easy removal of straight side tires, especially those of small diameter. Other forms are complicated in construction and therefore require considerable attention to maintain them in proper working condition.

In this invention, a plurality of arcuate segments adapted to form a circular drum is supported by a shaft. An arm is connected to one end of certain of the segments, and a shorter arm having links pivotally connected at the ends thereof, is pivotally secured adjacent the other end of the same segments. The other segments are pivotally connected to the first mentioned segments thus permitting a greater collapsing of the chuck than was possible heretofore. A linkage connection adjacent the pivoted ends of the said other segments is provided which limits the movement of these segments.

Figure 1:
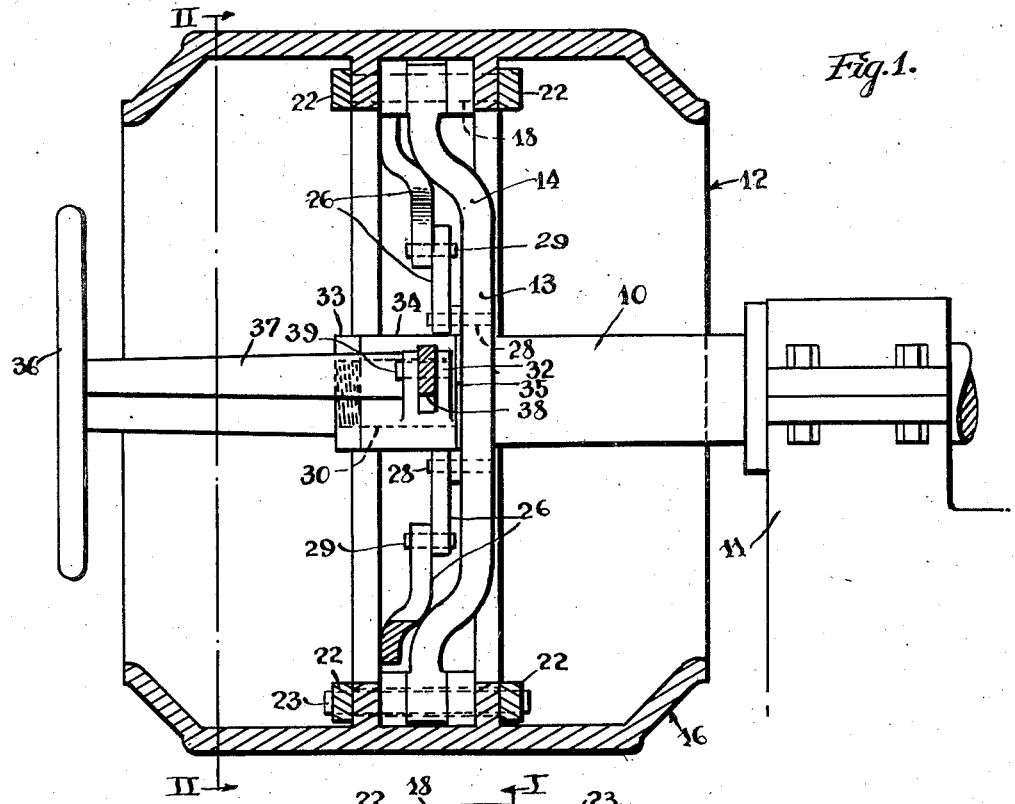
Figure 2:
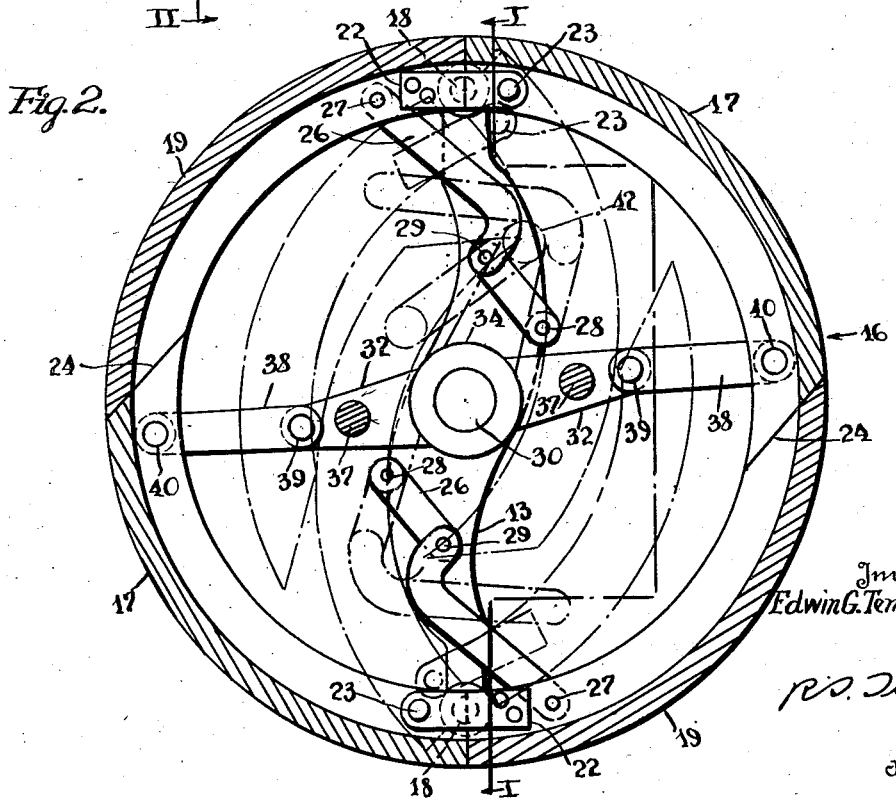

For a better understanding of the invention, reference may now be had to the accompanying drawing forming a part of this specification, in which:

Fig. 1 is a cross-sectional view of a tire building machine embodying a collapsible chuck constructed in accordance with the invention, taken substantially along the line I—I of Fig. 2; and Fig. 2 is a cross-sectional view of a collapsible chuck illustrating by dot and dash lines the portion of certain elements of the device in a collapsed condition, the view being taken substantially along the line II—II of Fig. 1.

In the embodiment of the invention illustrated by the accompanying drawing a driven shaft 10 rotatably supported in a tire building machine 11 constitutes a supporting member of a collapsible tire chuck 12. An arm 13 centrally offset, as indicated at 14, is rigidly secured intermediate its ends to the shaft 10 and rotates therewith.

A drum 16 includes a pair of relatively movable oppositely disposed segments 17 which are pivotally supported upon the arm 13 by means of pins 18. A second pair of relatively movable oppositely disposed segments 19 having plates 22 rigidly secured thereto are pivotally secured to the segments 17, by means of pins 23 that extend through the plates. It will be noted that the ends of the segments adjacent the ends of the arm 13 abut one another in a plane disposed substantially diametrically of the drum 12 and through the axis of the shaft 10, in order that the outward pivotal movement of the free ends may be limited. The free end of each segment is beveled as indicated at 24, and overlaps the end of an adjacent segment. This construction assures that the outward movement of the free end of one of the segments will cause a similar movement of the free end of the adjacent segment, so that means provided for extending the segments need operate directly upon one segment of each pair. A pair of links 26 comprising a toggle joint, is pivotally secured adjacent one end of each segment 19 by means of a pin 27 and is pivotally mounted on the arm 13 by means of a pin 28, thus assuring the proper movement of the segments 19. Each pair of links 26 is pivoted together at their inner ends, as indicated at 29. An end 30 of the shaft 10 extends through the arm 13 and an arm 32 having its central enlarged portion 34 rotatably mounted thereon is maintained in its proper position by means of a collar 33 threaded on the end of the shaft 10.

A hand wheel 36 is operatively connected to the arm 32 by means of spaced bars 37 secured at their inner ends to the arm 32 at each side of the enlarged portion 34. Each end of the arm 32 is pivotally connected, as indicated at 39, to one end of a link 38 and the other end of each link 38 is pivotally connected, as indicated at 40, to the free end portion of one of the segments 17. It is to be noted that the outer peripheral surfaces of the segments 17 are shorter than like surfaces of the other segments.

Movement of the arm 32 by the rotation of the hand wheel 36 in a clockwise direction as viewed in Fig. 2 causes the free end of the segments 17 to be moved inwardly toward the arm 13 about the pivot pins 18. This movement permits the segments 19 to be moved toward the arm also. In moving the arm 32 its ends contact with the links 26 adjacent the pivotal connections 29, thereby collapsing the segments 19 inwardly until the arm 32 and the segments 17 and 19 are positioned as indicated by the broken lines of Fig. 2. While moving inwardly the segments 19 pivot about the pins 23 of the rigidly mounted plates 22. Rotation of the hand wheel 36 in a counterclockwise direction forces the ends of the segments 17 outwardly, and the engagement of these arms with the free ends of the segments 19 forces the latter outwardly until they reach the position shown in the full lines of Fig. 2. Further outward pivotal movement of all the segments is prevented by the links 26 connected to the segments 19 and by the abutting engagement of the ends of the segments adjacent the ends of the arm 13.

Although I have illustrated the preferred form which the invention may assume and have described that form in detail, it will be apparent to those skilled in the art that the invention is not so limited but that various minor modifications may be made therein without departing from the spirit of the invention or from the scope of the appended claims.

What I claim is:

1. A collapsible chuck comprising a supporting member, an arm secured thereto intermediate its ends, a pair of arcuate segments, each segment pivotally connected to an end of the arm, an arcuate segment pivotally connected to each of the first mentioned segments, means for moving the free ends of said pair of segments, and means actuated by said first-named means for moving the free ends of the second-named segments.

2. A collapsible chuck comprising a supporting member, an arm secured thereto intermediate its ends, a pair of arcuate segments, each segment pivotally connected to an end of the arm, an arcuate segment pivotally connected to each of the first mentioned segments, means for moving the free ends of said pair of segments, and means operable by engagement with said first-named means for moving the free end of at least one of said second-named segments.

3. A collapsible chuck comprising a supporting member, an arm secured thereto intermediate its ends, a pair of arcuate segments, each segment pivotally connected to an end of the arm, a second pair of segments each of which is pivotally connected to one of the first mentioned segments adjacent the secured ends of the latter, the segments being so disposed as to form a substantially circular drum, a shorter arm rotatably mounted intermediate its ends on the supporting member, means pivotally connecting each end of the shorter arm to a point adjacent the free end of one of the first mentioned segments, and means pivotally secured to the second mentioned segments and operated by said shorter arm for controlling movement of the latter mentioned segments.

4. A collapsible chuck comprising a supporting member, an arm secured thereto intermediate its ends, a pair of arcuate segments, each segment pivotally connected to an end of the arm, a second pair of segments each of which is pivotally mounted upon one of the first mentioned segments, the segments being adapted to form a substantially circular drum, a shorter arm rotatably mounted intermediate its ends on the supporting member, links pivotally connecting the free ends of the shorter arm to points adjacent the free ends of certain of the segments for controlling movement thereof, and means engaged by the shorter arm for controlling movement of the other segments.

5. A collapsible chuck comprising a supporting member, an arm secured thereto intermediate its ends, a pair of oppositely disposed arcuate segments, each segment pivotally connected to an end of the arm, an arcuate segment pivotally connected on each of the first mentioned segments adjacent the secured ends thereof, a shorter arm rotatably mounted intermediate its ends on the supporting member, links pivotally connecting the free ends of the shorter arm to points adjacent the free ends of certain of the segments for controlling movement thereof, and toggle links coacting with the shorter arm for controlling movement of at least one of the other segments.

6. A collapsible chuck comprising a supporting member, an arm secured thereto intermediate its ends, pairs of arcuate segments pivotally secured together, one segment of each pair being pivotally connected to an end of the arm, the segments being so disposed as to form a substantially circular drum, a shorter arm rotatably mounted intermediate its ends on the supporting member, links pivotally connecting the free ends of the shorter arm to points adjacent the free ends of certain of the segments for controlling movement thereof, and toggle joints engaged by the shorter arm for controlling movement of the other segments.

7. A collapsible chuck comprising segments normally arranged in substantially circular configuration, a rotatable support for the segments, means mounted on the support for collapsing a plurality of the segments, and collapsing means for the remainder of the segments operable by engagement of the first mentioned means therewith after the operation of the first mentioned means has been initiated.

8. A collapsible chuck comprising segments normally arranged in substantially circular configuration, a rotatable support for the segments, means mounted on the support for collapsing certain of the segments, and link means connected between said support and at least one of the other segments, said link means being operable by engagement of said first-mentioned means therewith to collapse said last-mentioned segment.

9. A collapsible chuck comprising segments normally arranged in substantially circular configuration, a rotatable support for the segments, means mounted on the support for collapsing certain of the segments, and collapsing means for the other segments operable by engagement of the first-mentioned means therewith, the collapsing means for said other segments comprising toggle links pivotally connected between said other segments and said support.

10. A collapsible drum structure comprising a rotary spider, two oppositely swinging pairs of segments supported by said spider at opposite sides of the latter's axis of rotation, the members of each pair being connected with each other and with the spider by a compound hinge device to turn about different centers of which one is fixed on the spider and the other movable around the fixed center, means for collapsing one segment of each pair, and means for collapsing the other segment of each pair, said last named means being operable by engagement therewith of said first named means.

11. A collapsible drum structure comprising a rotary spider, two oppositely swinging pairs of segments supported by said spider at opposite sides of the latter's axis of rotation, the members of each pair being connected with each other and with the spider by a compound hinge device to turn about different centers of which one is fixed on the spider and the other movable around the fixed center, links for collapsing one segment of each pair, and toggle links engageable by said first-named links for collapsing the other segment of each pair.

EDWIN G. TEMPLETON.